(12) United States Patent
Anastassov et al.

(10) Patent No.: US 10,453,337 B2
(45) Date of Patent: Oct. 22, 2019

(54) METHOD AND APPARATUS FOR PROVIDING SAFETY LEVELS ESTIMATE FOR A TRAVEL LINK BASED ON SIGNAGE INFORMATION

(71) Applicant: HERE Global B.V., Veldhoven (NL)

(72) Inventors: Anton Anastassov, Veldhoven (NL); Eric Linder, Downers Grove, IL (US); Leon Oliver Stenneth, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/750,584

(22) Filed: Jun. 25, 2015

(65) Prior Publication Data

US 2016/0379485 A1 Dec. 29, 2016

(51) Int. Cl.
*G08G 1/01* (2006.01)
*G01C 21/32* (2006.01)
(Continued)

(52) U.S. Cl.
CPC .......... *G08G 1/0133* (2013.01); *G01C 21/32* (2013.01); *G01C 21/3415* (2013.01);
(Continued)

(58) Field of Classification Search
None
See application file for complete search history.

(56) References Cited

U.S. PATENT DOCUMENTS 8,606,512 B1 * 12/2013 Bogovich .............. G06Q 40/08
340/995.28
9,171,461 B1 * 10/2015 Dabell .................. G08G 1/0137
(Continued)

FOREIGN PATENT DOCUMENTS

CN 101901546 A * 12/2010
CN 108492557 A * 9/2018

OTHER PUBLICATIONS

Zilioniene et al., "Road Accidents Analysis with Bayesian Method as a Function of the Infrastructural, Environmental and Roadway Features", The XXVIII International Baltic Road Conference, Aug. 2013, retrieved on Jul. 15, 2015 from http://www.balticroads.org/downloads/28BRC/108_T06.pdf, 10 Pages.
(Continued)

*Primary Examiner* — Abby Y Lin
*Assistant Examiner* — Kelly D Williams
(74) *Attorney, Agent, or Firm* — Ditthavong & Steiner, P.C.

(57) ABSTRACT

An approach is provided for determining safety levels for one or more locations based, at least in part, on signage information. The approach involves determining signage information associated with at least one location. The approach also involves causing, at least in part, a creation of at least one predictor model based, at least in part, on the signage information and one or more attributes associated with the at least one location. The approach also involves causing, at least in part, a classification of the at least one location, one or more other locations, or a combination thereof according to one or more safety levels using, at least in part, the at least one predictor model.

12 Claims, 18 Drawing Sheets

(51) Int. Cl.
*G01C 21/34* (2006.01)
*G08G 1/0967* (2006.01)
*G08G 1/0968* (2006.01)
*G08G 1/0969* (2006.01)
*G06N 20/00* (2019.01)
*G08G 1/065* (2006.01)
*G09B 29/00* (2006.01)
*G01C 21/36* (2006.01)

(52) U.S. Cl.
CPC ..... *G01C 21/3492* (2013.01); *G01C 21/3602* (2013.01); *G01C 21/3694* (2013.01); *G06N 20/00* (2019.01); *G08G 1/0112* (2013.01); *G08G 1/0116* (2013.01); *G08G 1/0129* (2013.01); *G08G 1/0141* (2013.01); *G08G 1/065* (2013.01); *G08G 1/0969* (2013.01); *G08G 1/096716* (2013.01); *G08G 1/096758* (2013.01); *G08G 1/096775* (2013.01); *G08G 1/096816* (2013.01); *G08G 1/096844* (2013.01); *G08G 1/096866* (2013.01); *G09B 29/007* (2013.01)

(56) References Cited

U.S. PATENT DOCUMENTS

2005/0083211 A1* 4/2005 Shafir ................ G01C 21/3697
340/905

2010/0198488 A1* 8/2010 Groitzsch .............. G01C 21/26
701/117

OTHER PUBLICATIONS

Hong et al., "Development of Traffic Accident Prediction Models by Traffic and Road Characteristics in Urban Areas", Proceedings of the Eastern Asia Society for Transportation Studies, 2005, vol. 5, retrieved on Jul. 15, 2015 from http://www.easts.info/on-line/proceedings_05/2046.pdf, 16 Pages.

Beshah et al., "Mining Road Traffic Accident Data to Improve Safety:Role of Road-related Factors on Accident Severity in Ethiopia", 2010, retrieved on Jul. 15, 2015 from http://ai-d.org/pdfs/Beshah.pdf, 6 Pages.

Mussone et al., "Estimating the Accident Probability of a Vehicular Flow by Means of an Artificial Neural Network", Environment and Planning B Planning and Design (Impact Factor: 1.73), Dec. 1996; vol. 23(6), retrieved on Sep. 24, 2015 from http://epb.sagepub.com/content/23/6/667.full.pdf+html, pp. 667-675.

Zong et al., "Prediction for Traffic Accident Severity: Comparing the Bayesian Network and Regression Models", Mathematical Problems in Engineering, 2013, retrieved on Jul. 15, 2015 from downloads.hindawi.com/journals/mpe/2013/475194.pdf, 10 Pages.

* cited by examiner

FIG. 7

| Link id | Link length (m) | School zone sign | Stop sign | Ramp sign | Steep Hill Downwards sign | Rail road crossing sign | ... |
|---|---|---|---|---|---|---|---|
| 12345 | 140 | true | true | false | false | false | ... |
| 24689 | 1025 | false | false | true | true | false | ... |

FIG. 8

| Link id | probe density | School zone sign | Rail way crossing sign | Stop sign | Road narrows sign | Steep hill sign | Previously used features | Label |
|---|---|---|---|---|---|---|---|---|
| 1234 | 5 | true | true | false | true | true | ... | High accident potential |
| 2468 | 0.25 | false | false | true | false | false | ... | Low accident potential |
| ... | ... | ... | ... | ... | ... | ... | ... | ... |

| Link id | probe density 901 | School zone sign 903 | Rail way crossing sign 905 | Pedestrian crossing sign 907 | Road narrows sign 909 | Steep hill sign 911 | Candidate vehicle features (e.g. speed, acc, etc.) 913 | Number accidents 915 |
|---|---|---|---|---|---|---|---|---|
| 1234 | 5 | true | true | false | true | true | ... | 27 |
| 2468 | 0.25 | false | false | true | false | false | ... | 3 |
| ... | ... | ... | ... | ... | ... | ... | ... | ... |

METHOD AND APPARATUS FOR PROVIDING SAFETY LEVELS ESTIMATE FOR A TRAVEL LINK BASED ON SIGNAGE INFORMATION

BACKGROUND

Service providers and device manufacturers (e.g., wireless, cellular, etc.) are continually challenged to deliver value and convenience to consumers by, for example, providing compelling network services. One area of interest has been determining safety levels for locations (links, intersections, nodes, road segments, etc.) based on signage information (e.g., traffic signs) in conjunction with traffic and location attributes information. Signage information associated with the locations reflects road conditions and provides information beyond road geometry. Accordingly, road features and/or road attributes can be directly extracted from the traffic signs, thereby enriching the information from other sources. Since, the traffic signs enable retrieval of various information related to the locations in an alternative way, service providers and device manufacturers face significant technical challenges in providing a service that considers traffic signs to determine accident prone locations, accident probability for at least one vehicle, or a combination thereof.

Some Example Embodiments

As a result, there is a need for an approach for determining safety levels for one or more locations based, at least in part, on signage information.

According to one embodiment, a method comprises determining signage information associated with at least one location. The method also comprises causing, at least in part, a creation of at least one predictor model based, at least in part, on the signage information and one or more attributes or features associated with the at least one location. The method further comprises causing, at least in part, a classification of the at least one location, one or more other locations, or a combination thereof according to one or more safety levels using, at least in part, the at least one predictor model.

According to another embodiment, an apparatus comprises at least one processor, and at least one memory including computer program code for one or more computer programs, the at least one memory and the computer program code configured to, with the at least one processor, cause, at least in part, the apparatus to determine signage information associated with at least one location. The apparatus is also caused to cause, at least in part, a creation of at least one predictor model based, at least in part, on the signage information and one or more attributes or features associated with the at least one location. The apparatus is further caused to cause, at least in part, a classification of the at least one location, one or more other locations, or a combination thereof according to one or more safety levels using, at least in part, the at least one predictor model.

According to another embodiment, a computer-readable storage medium carries one or more sequences of one or more instructions which, when executed by one or more processors, cause, at least in part, an apparatus to determine signage information associated with at least one location. The apparatus is also caused to cause, at least in part, a creation of at least one predictor model based, at least in part, on the signage information and one or more attributes associated with the at least one location. The apparatus is further caused to cause, at least in part, a classification of the at least one location, one or more other locations, or a combination thereof according to one or more safety levels using, at least in part, the at least one predictor model.

According to another embodiment, an apparatus comprises means for determining signage information associated with at least one location. The apparatus also comprises means for causing, at least in part, a creation of at least one predictor model based, at least in part, on the signage information and one or more attributes associated with the at least one location. The apparatus further comprises means for causing, at least in part, a classification of the at least one location, one or more other locations, or a combination thereof according to one or more safety levels using, at least in part, the at least one predictor model.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 is a graph diagram that represents a map database with link length and sign information, according to one example embodiment; the length can be used as a normalization criteria for links FIG. 8 is a graph diagram that represents a map database with road link information, probe data (i.e., probe density information), sign information, or a combination thereof for classification training, according to one example embodiment;

FIG. 9 is a graph diagram that represents a map database with road link information, probe data (i.e., probe density information), sign information, or a combination thereof for predicting accident probability for at least one vehicle, according to one example embodiment;

DESCRIPTION OF SOME EMBODIMENTS

Figure 1A:
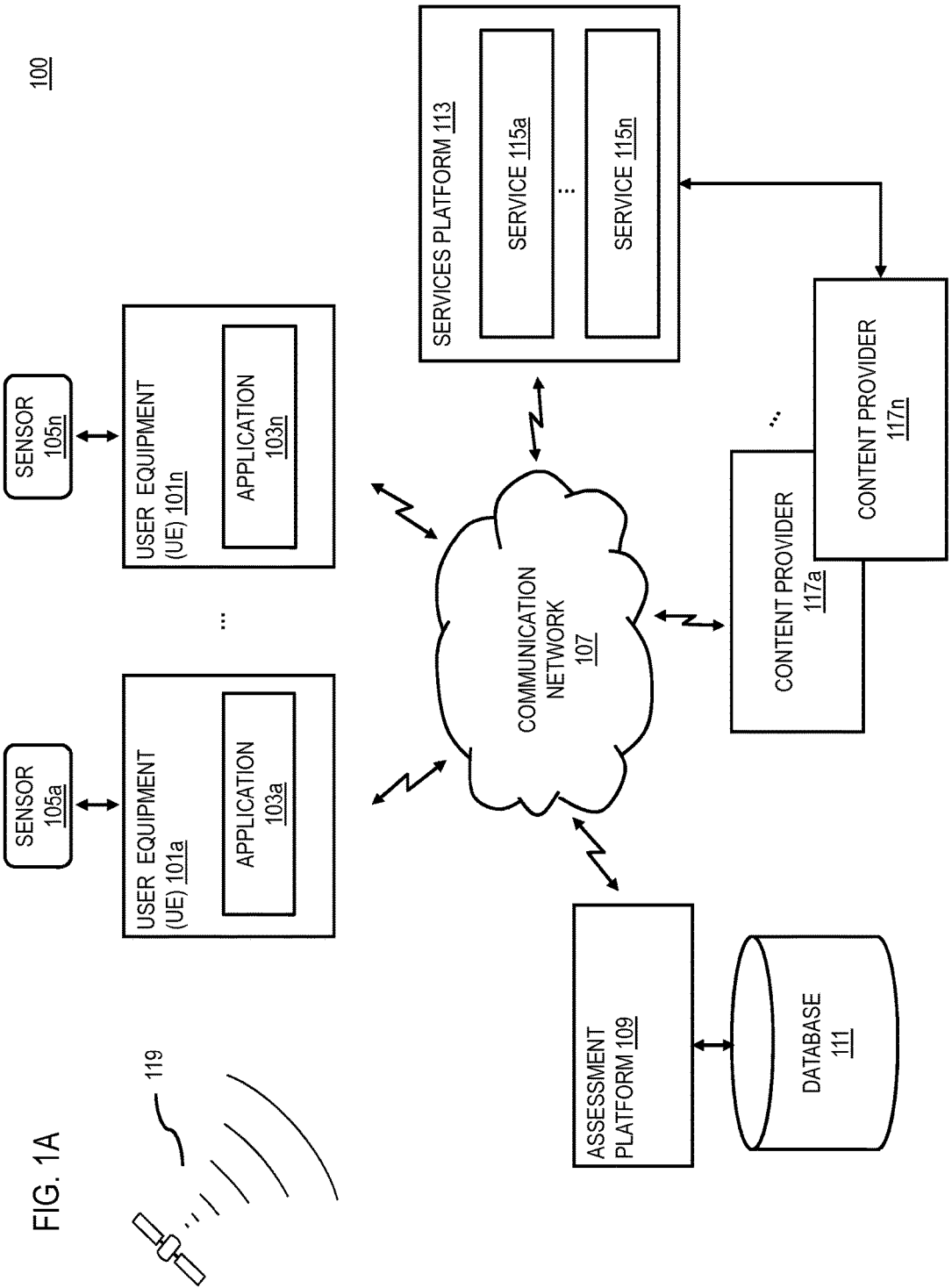
FIG. 1A is a diagram of a system capable of determining safety levels for one or more locations based, at least in part, on signage information, according to one embodiment.

Examples of a method, apparatus, and computer program for determining safety levels for one or more locations based, at least in part, on signage information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a system capable of determining safety levels for one or more locations based, at least in part, on signage information, according to one embodiment. In one scenario, accident prone locations and/or the probability for a vehicle to crash may be determined by taking into consideration road features (e.g., slope, curvature), road attributes (e.g., number of lanes, width of road), attributes of the candidate vehicle (e.g., speed, acceleration), environmental features (e.g., weather), and traffic conditions (e.g. congestion or free flow). In another scenario, signage information and normalized probe density information associated with one or more road links may also be utilized to determine accident prone locations and/or the probability for a vehicle to crash. Since raw probe density information are not very informative, properly normalized probes density data may be used to approximate traffic flow density. The road signs inherently tell information about the property of the road links that can be used in accident predictions, for example, the winding road sign indicates not only that the road link has high curvature, but that it may present a safety hazard and requires a warning. Hence, previously used features are rendered redundant because signage information provides additional information that enriches the available information. Further, certain information may be unavailable from other sources or only partially available, such as, a no-passing sign may indicate poor visibility for oncoming traffic. Therefore, system 100 of FIG. 1 introduces the capability to consider traffic signs to reflect road conditions, add information beyond road geometry that was used in prior works, and modify driver behavior (e.g., drivers react to the signs, and violation of signs creates dangerous driving situations). On the other hand, probe data provides information on speed, location and timestamp for at least one vehicle traveling along at least one location. The probe density which is the number of probes per unit length of link may be used to determine accident probability for at least one vehicle.

In one scenario, the new attributes signage information considers the traffic signs on the road, for example, a no-passing sign on a road link may indicate a higher probability of an accident. The signage information on the road inherently tells information about the property of the road. In another scenario, probe density information is GPS report consisting of speed, location, and timestamp from a vehicle traveling along the link. The probe density information may be determined by calculating number of probes/length of the road link. System 100 of FIG. 1 considers probes instead of direct traffic volume because probes after filtering and careful selections can be used as a proxy for traffic volume, thereby avoiding the need for dedicated traffic volume measurements, which are difficult to perform globally. In one scenario, traffic volume may be used if available, the probes serve as a backup. If historic and sufficiently detailed traffic volume information is not available, probes approximation may be used. Further, if there is no real-time traffic volume feed in the area of interest, semi-real-time probe information may be used. It is sufficient to know the relative traffic volume on different road segments and/or time periods to build supervised machine learning models.

As shown in FIG. 1A, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to an assessment platform 109 via the communication network 107. In one embodiment, the assessment platform 109 performs one or more functions associated with determining safety levels for one or more locations based, at least in part, on signage information.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or Wi-Fi connection either through the inbuilt communication equipment or from the UE 101 associated with the vehicles. The applications 103 may assist in conveying sensor information via the communication network 107.

By way of example, the applications 103 may be any type of application that is executable at the UE 101, such as mapping application, location-based service applications, navigation applications, content provisioning services, camera/imaging application, media player applications, social networking applications, calendar applications, and the like. In one embodiment, one of the applications 103 at the UE 101 may act as a client for the assessment platform 109 and perform one or more functions associated with the functions of the assessment platform 109 by interacting with the assessment platform 109 over the communication network 107.

By way of example, the sensors 105 may be any type of sensor. In certain embodiments, the sensors 105 may include, for example, a global positioning sensor for gathering location data, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., traffic sign information can be populated by highly assisted vehicles that have cameras and image recognition techniques), an audio recorder for gathering audio data, velocity sensors, and the like. In another embodiment, the sensors 105 may include light sensors, oriental sensors augmented with height sensor and acceleration sensor (e.g., an accelerometer can measure acceleration and can be used to determine orientation of the UE 101), tilt sensors to detect the degree of incline or decline of the vehicle along a path of travel, moisture sensors, pressure sensors, etc. In a further example embodiment, sensors about the perimeter of the vehicle may detect the relative distance of the vehicle from lanes or roadways, the presence of other vehicles, pedestrians, traffic lights, road features (e.g., curves) and any other objects, or a combination thereof. In one scenario, the sensors 105 may detect weather data, traffic information, or a combination thereof. In one example embodiment, the UE 101 may include GPS receivers to obtain geographic coordinates from satellites 119 for determining current location and time associated with the UE 101. Further, the location can be determined by a triangulation system such as A-GPS, Cell of Origin, or other location extrapolation technologies. In another example embodiment, the one or more sensors may provide in-vehicle navigation services, wherein one or more location based services may be provided to the at least one vehicle and/or at least one UE 101 associated with the at least one vehicle.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the assessment platform 109 may be a platform with multiple interconnected components. The assessment platform 109 may include multiple servers, intelligent networking devices, computing devices, components and corresponding software for determining safety levels for one or more locations based, at least in part, on signage information. In addition, it is noted that the assessment platform 109 may be a separate entity of the system 100, a part of the one or more services 115a-115n (collectively referred to as services 115) of the services platform 113, or included within the UE 101 (e.g., as part of the applications 103).

In one embodiment, the assessment platform 109 determines signage information associated with at least one location. In one embodiment, the at least one location includes road links (e.g., a stretch of road), nodes (e.g., points where two or more road links connect). Then, the assessment platform 109 causes, at least in part, a creation of at least one predictor model based, at least in part, on the signage information and one or more attributes associated with the at least one location. Subsequently, the assessment platform 109 causes, at least in part, a classification of the at least one location, one or more other locations, or a combination thereof according to one or more safety levels using, at least in part, the at least one predictor model. In one example embodiment, the assessment platform 109 may classify one or more intersections using a predictor model as safe or dangerous. The definition of dangerous is adjustable based, at least in part, on user needs, on number of accidents in a specific time period, on number of accidents per number of drives, or a combination thereof.

In one example embodiment, the assessment platform 109 may provide a color coded map based on accident intensity thereby making it is easy for users to visualize and avoid accident prone locations. In one scenario, the map may show a marking for areas that are dangerous according to the definition and classified as such by the predictor model. In another scenario, the map may show intermediate markings for areas the predictor model perceives to be risky but are not dangerous. In a further scenario, the map may show safe markings for areas perceived as safe. In another example embodiment, the assessment platform 109 may use accident prone locations to notify drivers and modify the driving strategy of vehicles (e.g., autonomous vehicles) when they approach accident prone areas, for example, the assessment platform 109 may provide routes that avoid accident prone locations. In one scenario, the insurance companies may vary their policy according to a driver's frequency at the accident prone locations.

In one embodiment, the geographic database 111 stores information on road links (e.g., road length, road breadth, slope information, curvature information, etc.), probe data for one or more road links (e.g., traffic density information), historical accident data, and traffic sign information alongside the road links. The information may be any multiple types of information that can provide means for aiding in the content provisioning and sharing process. In another embodiment, the geographic database 111 may be in a cloud and/or in a vehicle (e.g., cars) and/or a mobile device (e.g., phone).

The services platform 113 may include any type of service. By way of example, the services platform 113 may include mapping services, navigation services, travel planning services, notification services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the assessment platform 109 and the content provider 117 to supplement or aid in the processing of the content information.

By way of example, the services 115 may be an online service that reflects interests and/or activities of users. The services 115 allow users to share location information (e.g., speed information), activities information (e.g., travel plans), contextual information, historical user information and interests within their individual networks, and provides for data portability. The services 115 may additionally assist in providing the assessment platform 109 with information on travel plans of at least one user, activity information for at least one user in at least one location, speed information for at least one user, user profile information, and a variety of additional information.

The content providers 117a-117n (collectively referred to as content provider 117) may provide content to the UE 101, the assessment platform 109, and the services 115 of the services platform 113. The content provided may be any type of content, such as, image content (e.g., maps), textual content, audio content, video content, etc. In one embodiment, the content provider 117 may provide content that may supplement content of the applications 103, the sensors 105, or a combination thereof. In one embodiment, the content provider 117 may also store content associated with the UE 101, the assessment platform 109, and the services 115 of the services platform 113. In another embodiment, the content provider 117 may manage access to a central repository of data, and offer a consistent, standard interface to data, such as, attributes, probe data, and traffic sign information for one or more road links.

By way of example, the UE 101, the assessment platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
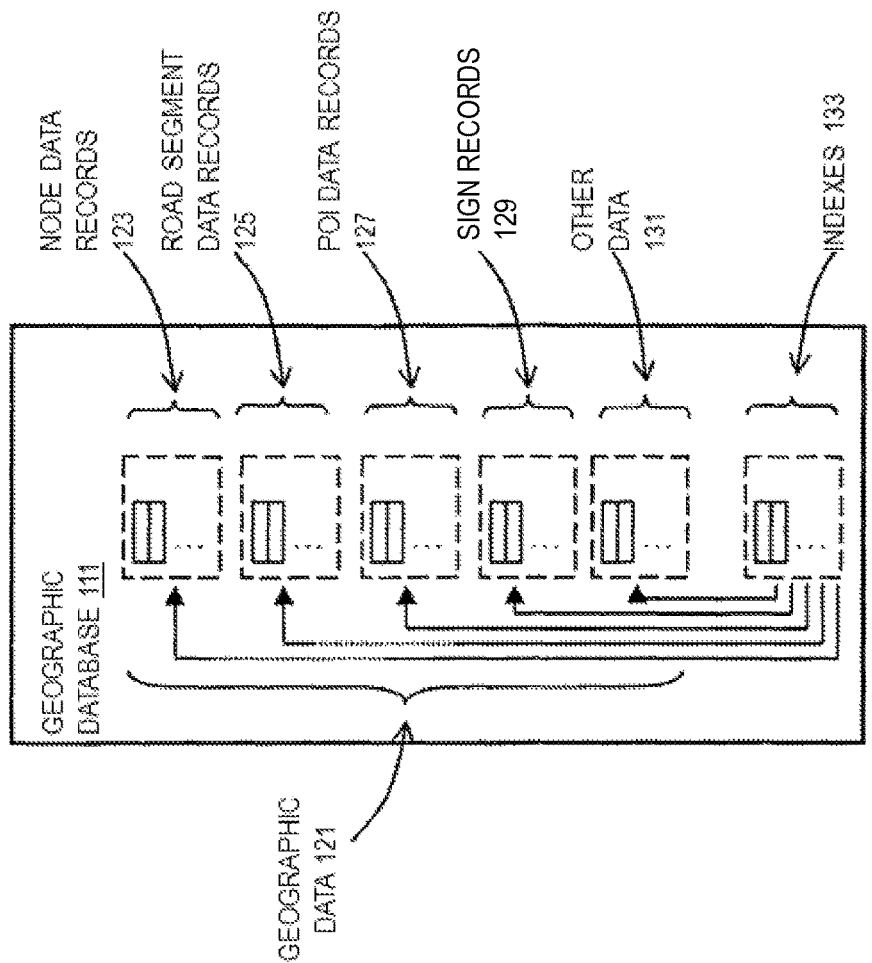
FIG. 1B is a diagram of the geographic database 111 of system 100, according to exemplary embodiments.

FIG. 1B is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 121 used for (or configured to be compiled to be used for) mapping and/or navigation-related services, such as for personalized route determination, according to exemplary embodiments. For example, the geographic database 111 includes node data records 123, road segment or link data records 125, POI data records 127, sign records 129, and other data records 131, for example. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, parking areas, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city). In addition, the geographic database 111 includes sign records 129 that stores traffic signs associated with the one or more locations in the POI data records 127.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities (e.g., designated parking areas). In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the UE 101 to provide an end user with navigation features. In such a case, the geographic database 111 can be downloaded or stored on the UE 101, such as in the applications 103, or the UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions, for example, road link map updates.

Figure 2:
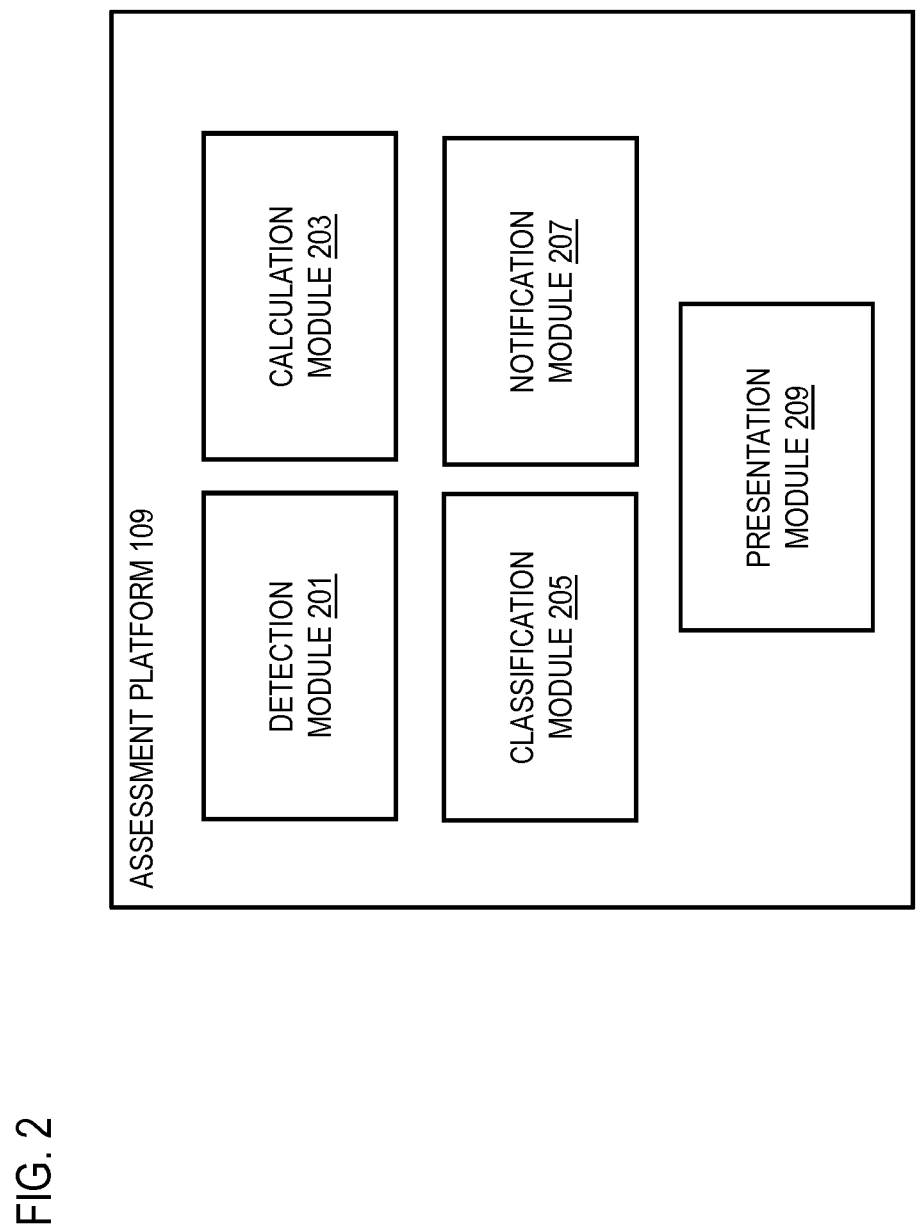
FIG. 2 is a diagram of the components of the assessment platform 109, according to one embodiment.

FIG. 2 is a diagram of the components of the assessment platform 109, according to one embodiment. By way of example, the assessment platform 109 includes one or more components for determining safety levels for one or more locations based, at least in part, on signage information. It is contemplated that the functions of these components may be combined in one or more components or performed by other components of equivalent functionality. In this embodiment, the assessment platform 109 includes a detection module 201, a calculation module 203, a classification module 205, a notification module 207, and a presentation module 209.

In one embodiment, the detection module 201 may detect one or more attributes, probe data, traffic signage information, or a combination thereof for one or more road links, one or more nodes, or a combination thereof. In one scenario, the one or more attributes includes slope information, curvature information, lanes information, width information, or a combination thereof. In another scenario, the probe data includes location information, speed information, timestamp information, or a combination thereof for one or more vehicles, traffic density information for the one or more road links, or a combination thereof. In a further scenario, the traffic signage information includes characteristics (e.g., physical dimension, color, and size of the traffic signs) and/or positioning of traffic signs, non-traffic signs, or a combination thereof. In another embodiment, the detection module 201 may detect or update traffic signage information in real-time. In one scenario, the traffic signage information may be retrieved from a map, a database, a cloud, sensor 105, etc.

In one embodiment, the calculation module 203 may predict danger level for the one or more road links, the one or more nodes, or a combination thereof based, at least in part, on the detected attributes, probe data, and traffic signage information. In another embodiment, the calculation module 203 may determine acceleration information for one or more vehicles, the number of accidents on the one or more road link per unit time, or a combination thereof to determine accident probability for the one or more vehicles. In a further embodiment, the calculation module 203 may determine accident probability threshold level in real-time for the one or more users, the one or more vehicles, or a combination thereof. In another embodiment, the calculation module 203 may cause a filtering of the probe data then map-match the probe data and historical accident data associated with the one or more road links, the one or more nodes, or a combination thereof for computing a normalized probe density value. In a further embodiment, the calculation module 203 may recognize probe data and/or traffic signage information for the at least one road link without the historical accident data to determine accident potential.

In one embodiment, the classification module 205 may classify one or more road links, the one or more nodes, or a combination thereof as high accident potential, low accident potential, or a combination thereof based, at least in part, on the danger level. In one scenario, the historical accident data is used as ground truth to train the classification module 205. In another embodiment, the classification module 205 may cause a ranking of the one or more road links, the one or more nodes, or a combination thereof within the classified categories based, at least in part, on the probe density value, the traffic signage information, or a combination thereof.

In one embodiment, the notification module 207 may cause a notification to one or more users, the one or more vehicles, or a combination thereof on accident prone locations based, at least in part, on the ranking. In another embodiment, the notification module 207 may cause an alarm notification if the accident probability threshold level is surpassed. The one or more notification may include sound notification, display notification (e.g., a color representation of the accident prone location in a mapping interface), vibration, or a combination.

In one embodiment, the presentation module 209 obtains a set of summary statistics from other modules, and continues with providing a presentation of traffic map representing one or more locations. In another embodiment, the presentation module 209 may cause a heat-map representation for high accident potential road links. In a further embodiment, the presentation module 209 may cause a presentation of modified routing information for the one or more vehicles based, at least in part, on proximity of the one or more vehicles to the accident prone locations.

The above presented modules and components of the assessment platform 109 can be implemented in hardware, firmware, software, or a combination thereof. Though depicted as a separate entity in FIG. 1, it is contemplated that the assessment platform 109 may be implemented for direct operation by respective UE 101s. As such, the assessment platform 109 may generate direct signal inputs by way of the operating system of the UE 101 for interacting with the applications 103. In another embodiment, one or more of the modules 201-209 may be implemented for operation by respective UE 101s, as an assessment platform 109, or combination thereof. Still further, the assessment platform 109 may be integrated for direct operation with the services 115, such as in the form of a widget or applet, in accordance with an information and/or subscriber sharing arrangement. The various executions presented herein contemplate any and all arrangements and models.

Figure 3:
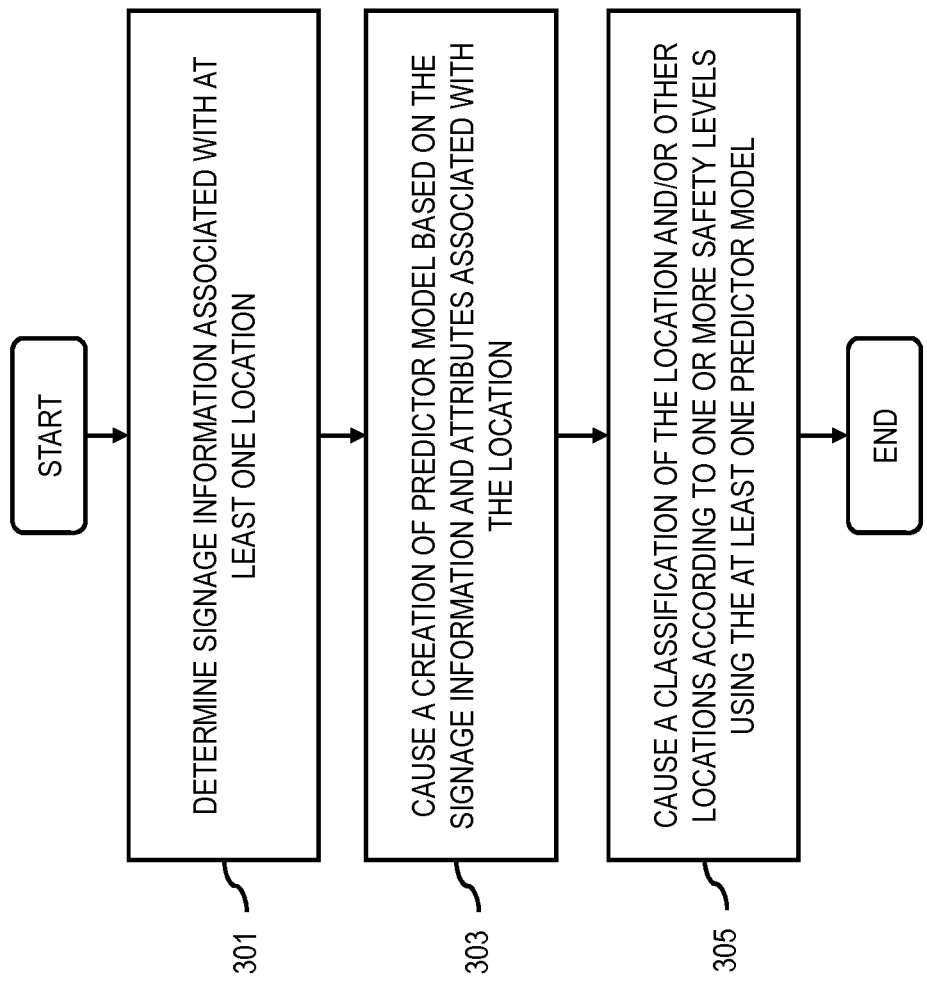
FIG. 3 is a flowchart of a process for causing a classification of locations and/or other locations based on safety levels determined by predictor model, according to one embodiment.
Figure 15:
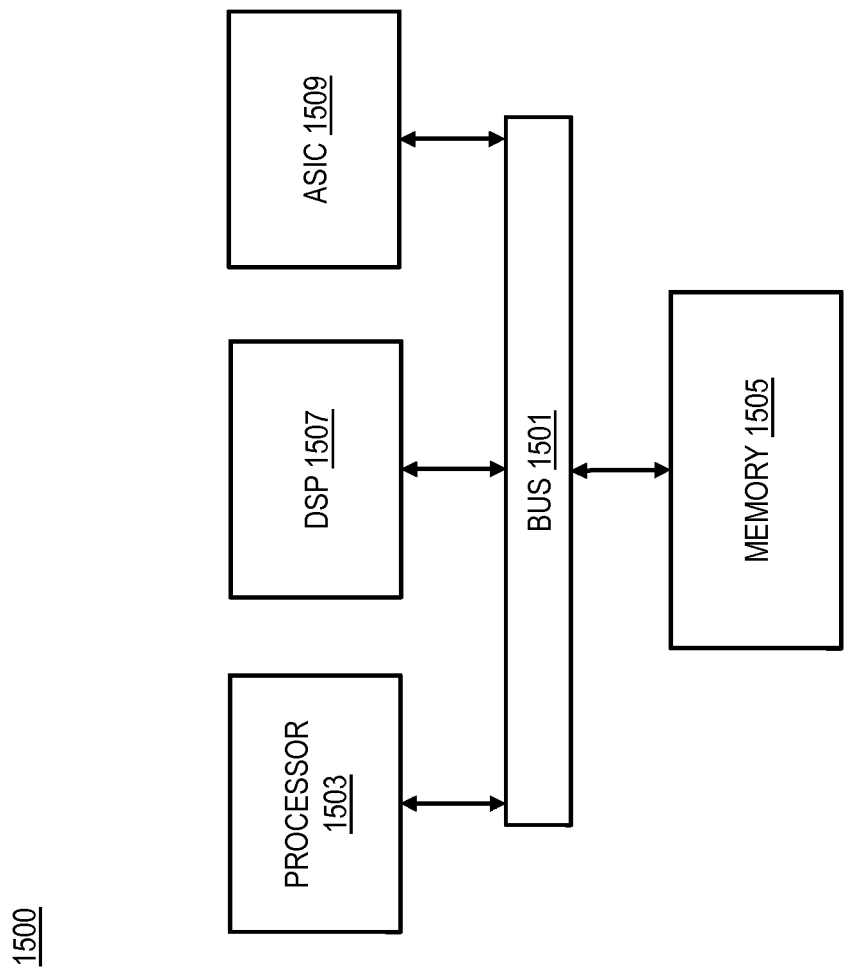
FIG. 15 is a diagram of a chip set that can be used to implement an embodiment of the invention.

FIG. 3 is a flowchart of a process for causing a classification of locations and/or other locations based on safety levels determined by predictor model, according to one embodiment. In one embodiment, the assessment platform 109 performs the process 300 and is implemented in, for instance, a chip set including a processor and a memory as shown in FIG. 15.

In step 301, the assessment platform 109 may determine signage information associated with at least one location. In one embodiment, the signage information includes, at least in part, a presence of one or more signs in the at least one location, one or more characteristics of the one or more signs, one or more locations of the one or more signs, or a combination thereof. In another embodiment, the signage information includes the absence of the one or more signs in the at least one location, a detectability of the one or more signs, or a combination thereof. In one scenario, the road geometry with high curvature may indicate the absence of signage information, for example, travel links with higher accident rate requires traffic signs indicating the drivers of the potential dangers. In one example embodiment, the assessment platform 109 considers the frequency of the road signs, the visibility of the road signs (e.g., positioning of signs), the detectability of the road signs by one or more autonomous vehicles (e.g., built-up area signs that are not standardized and is difficult for automated vehicles to detect, painted signs that are not detectable by automated vehicles, etc.), the features (colors, dimensions, etc.) of the road signs, or a combination thereof. In another embodiment, the one or more signs include, at least in part, one or more physical signs, one or more virtual signs, or a combination thereof; and wherein the one or more signs include, at least in part, one or more traffic signs, one or more non-traffic signs (e.g., billboard signs, municipal signs), or a combination thereof. In a further embodiment, the one or more signs include, at least in part, temporary signs (e.g., road hazard signs, road flares signs), permanent signs, or a combination thereof.

In step 303, the assessment platform 109 may cause, at least in part, a creation of at least one predictor model based, at least in part, on the signage information and one or more attributes associated with the at least one location. In one embodiment, the one or more attributes associated with the at least one location includes, at least in part, a traffic volume attribute. In one scenario, the predictive model includes probe information that determines typical vehicle speed and traffic volumes at the time of day and conditions of interest. The probe information does not have to be associated with one vehicle, and in fact, are based on historical information from numerous vehicles. For real time, or quasi-real time updates on the conditions, probe information in a relatively short time preceding the event of calculating the risk may be considered. In another embodiment, the assessment platform 109 may consider other contextual information associated with the at least one location, for example, geographical features of the road (e.g., slope, curvature), road attributes (e.g., number of lanes, width of the road, surface of the road), attributes of the candidate vehicle (e.g., speed, acceleration), environmental features (e.g., weather, season), temporal information (e.g., day, time), historical accident data and traffic conditions (e.g. congestion or free flow). In one embodiment, (a) the creation of the at least one predictor model; (b) the classification of the at least one location, one or more other locations, or a combination thereof; or (c) a combination thereof is performed with respect to an individual user, a group of users, or a combination thereof.

In step 305, the assessment platform 109 may cause, at least in part, a classification of the at least one location, one or more other locations, or a combination thereof according to one or more safety levels using, at least in part, the at least one predictor model. In one scenario, the assessment platform 109 may cause a classification of the one or more road links, the one or more nodes, or a combination thereof as high accident potential, intermediate accident potential, low accident potential, or a combination thereof based, at least in part, on the safety level.

Figure 4:
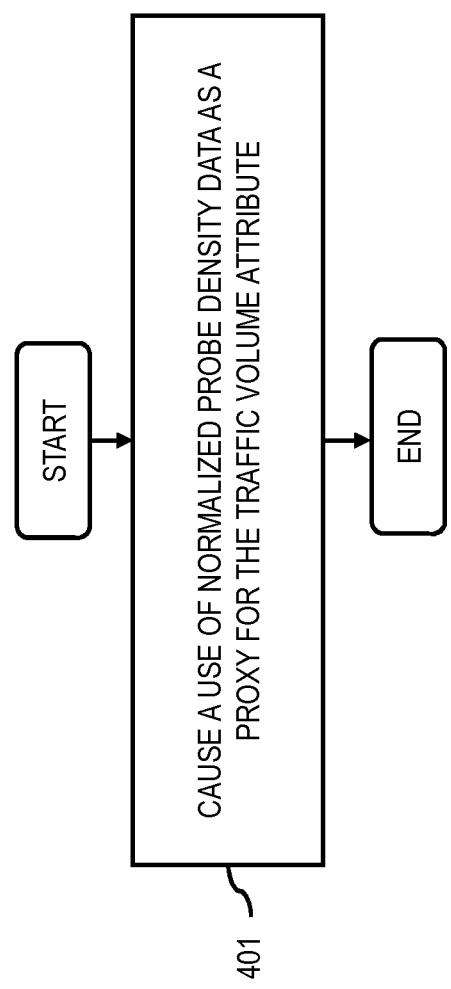
FIG. 4 is a flowchart of a process for using normalized probe density data as a proxy for traffic volume attribute, according to one embodiment.

FIG. 4 is a flowchart of a process for using normalized probe density data as a proxy for traffic volume attribute, according to one embodiment. In one embodiment, the assessment platform 109 performs the process 400 and is implemented in, for instance, a chip set including a processor and a memory as shown in FIG. 15.

In step 401, the assessment platform 109 may cause, at least in part, a use of normalized probe density data as a proxy for the traffic volume attribute. In one embodiment, normalized probe density data is computed per probes data/length of road link. The probe data includes, at least in part, location information, speed information, timestamp information, or a combination thereof for one or more vehicles in at least one road link. The assessment platform 109 may filter the determined probe data and cause a map-matching with the historical accident data associated with the at least one road link for computing a normalized probe density value.

Figure 5:
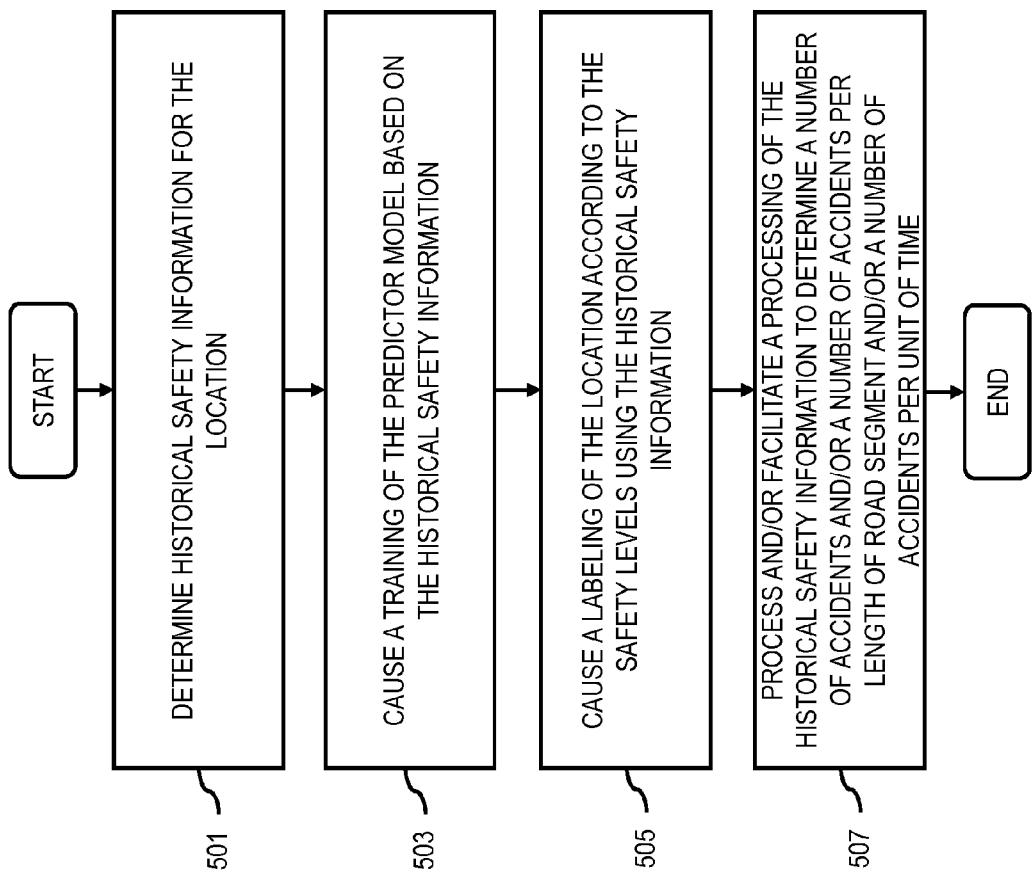
FIG. 5 is a flowchart of a process for causing a training of predictor model based, at least in part, on historical safety information, according to one embodiment.

FIG. 5 is a flowchart of a process for causing a training of predictor model based, at least in part, on historical safety information, according to one embodiment. In one embodiment, the assessment platform 109 performs the process 500 and is implemented in, for instance, a chip set including a processor and a memory as shown in FIG. 15.

In step 501, the assessment platform 109 may determine historical safety information for the at least one location. The historical safety information includes, at least in part, historical accident information for the at least one location. In one scenario, the historical accident information includes the total number of accidents that occurred in at least one road link within a certain time period or a lack thereof.

In step 503, the assessment platform 109 may cause, at least in part, a training on the at least one predictor model based, at least in part, on the historical safety information. In one scenario, the predictor model may use the historical safety information to determine accident potential for at least one road link.

In step 505, the assessment platform 109 may cause, at least in part, a labeling of the at least one location according to the one or more safety levels using the historical safety information. The training of the at least one predictor model is based, at least in part, on the labeling. In one scenario, the predictor model may label sections of the road as high accident potential or low accident potential. In other implementations, more labels (e.g. medium accident potential) can be assigned.

In step 507, the assessment platform 109 may process and/or facilitate a processing of the historical safety information to determine a number of accidents, a number of accidents per length of road segment, a number of accidents per unit of time, or a combination thereof. The labeling of the at least one location is based, at least in part, on the number of accidents, the number of accidents per length of road segment, the number of accidents per unit of time, or a combination thereof. In one example embodiment, the assessment platform 109 may label at least one road link as dangerous if the number of accident is high.

Figure 6:
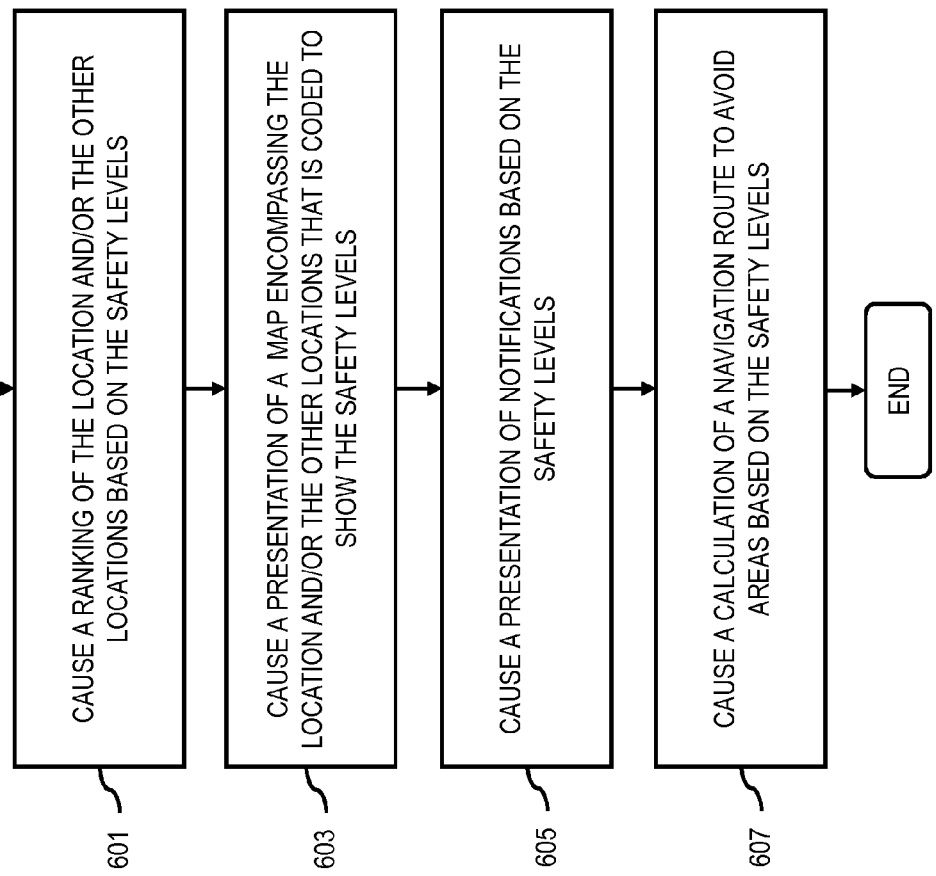
FIG. 6 is a flowchart of a process for causing a notification and/or a calculation of new routes based, at least in part, on safety levels of one or more road links, according to one embodiment.

FIG. 6 is a flowchart of a process for causing a notification and/or a calculation of new routes based, at least in part, on safety levels of one or more road links, according to one embodiment. In one embodiment, the assessment platform 109 performs the process 600 and is implemented in, for instance, a chip set including a processor and a memory as shown in FIG. 15.

In step 601, the assessment platform 109 may cause, at least in part, a ranking of the at least one location, the one or more other locations, or a combination thereof based, at least in part, on the one or more safety levels. In one scenario, the assessment platform 109 may rank one or more road links based, at least in part, on accident intensity, traffic signage information, probe density value, or a combination thereof.

In step 603, the assessment platform 109 may cause, at least in part, a presentation of at least one map encompassing the at least one location, the one or more other locations, or a combination thereof that is coded to show the one or more safety levels. In one scenario, the assessment platform 109 may present a color representation of the accident-prone location in a mapping interface to one or more users and/or one or more vehicles.

In step 605, the assessment platform 109 may cause, at least in part, a presentation of one or more notifications based, at least in part, on the one or more safety levels. In one scenario, the assessment platform 109 may provide an alarm notification to alert the users on the safety levels of road links. The alarm notification includes sound notification, display notification, vibration, or a combination thereof.

In step 607, the assessment platform 109 may cause, at least in part, a calculation of at least one navigation route to avoid one or more areas based, at least in part, on the one or more safety levels. In one scenario, the assessment platform 109 may recalculate the route for at least one vehicle based, at least in part, on proximity of the vehicle to the accident-prone location.

In one scenario, the assessment platform 109 may consider attributes on geography of one or more road links (e.g., slopes, curvatures), attributes of one or more road links (e.g., the number of lanes, the width of the road), probe density, traffic signage information, or a combination thereof to determine accident potential for a section of a road. FIG. 7 is a graph diagram that represents a map database with link length and sign information, according to one example embodiment. The assessment platform 109 may consider traffic signs that are present on the link to determine accident-prone locations. The traffic signs may include but is not limited to the following:

Ramp—A traffic sign that indicates whether a ramp is on the link;
Paved;
Railway crossing protected;
Railway crossing unprotected;
Winding road starting right;
Lane merge right;
Sharp curve left;

Steep hill;
Sharp curve right;
Winding road starting left;
Lane merge center;
Parking lot road;
Tramway crossing
Steep hill downwards;
Animal crossing;
Start of no overtaking;
Road narrows;
Icy conditions;
Warning risk of grounding;
Protected overtaking extra lane;
Lateral wind;
Sharp curve;
Reversible;
Tunnels;
Bridges;
Pedestrian crossings;
Falling rocks;
Road works or under construction;

In one example embodiment, the assessment platform 109 may determine the length for one or more road links 701. Then, the assessment platform 109 may consider various traffic signs 703, 705, 707, 709, and 711 along the determined length of the road link 701. Subsequently, the assessment platform 109 may determine accident prone locations in the road link based, at least in part, on the traffic signs. In one scenario, the length for one or more road links may be stored in the database 111, and the probe density may be estimated on sub-link level as per requirement.

FIG. 8 is a graph diagram that represents a map database with road link information, probe data (i.e., probe density information), sign information, or a combination thereof for classification training, according to one example embodiment. In one scenario, the probe data 801 includes speed information, location information, timestamp, or a combination thereof for one or more vehicles traversing at at least one road link. In one example embodiment, the assessment platform 109 may construct a supervised machine learning classification model that determines danger levels for road links using features of signage (e.g., traffic signs 803, 805, 807,809, and 811) and link probe density 801. In one scenario, the assessment platform 109 may filter the probe data 801. Then, the assessment platform 109 may either suppress or re-weight the probe data 801 received from one or more vehicles to prevent skewing of the routing data. After pre-processing of probe data 801, the assessment platform 109 may cause map-matching to associate probe data 801 with the one or more road links. Subsequently, the assessment platform 109 may compute a normalized probe density value for each link. This road link associated accident data along with the features on signage and probe density of the link forms a machine learning training One procedure for computing normalized probe density per link is as follows:

> Probe density=number of map matched probes on a link/length of link

In one example embodiment, the assessment platform 109 may construct a supervised learning classification model using the signage and the normalized probe density data in addition to geometry of road links 813 (e.g., slope and curvature values). The assessment platform 109 may implement decision trees, neural networks, rule models, etc. in performing the classification techniques. The supervised learning classification model may automatically recognize and determine high and low accident level for one or more road links based on inputs, such as, probe density and/or signage. In one scenario, the assessment platform 109 may use the historical location based accident data to label one or more sections of the road links as either high accident potential 815 or low accident potential 815. To determine the label of high accidents or low accidents, a threshold on the number of accidents may be considered by the assessment platform 109. Further, this supervised learning classification model may automatically predict accident potential for one or more road links with no historical accident data. Since, the trained learning model (i.e., supervised learning classification model) automatically determines safety levels for sections of one or more road links, this model is transferable.

In another example embodiment, the assessment platform 109 may assign more labels (e.g., medium accident) considering different strategies as follows:

(a) Number of accidents/length of road section; and
(b) Number of accidents/duration of accident data collection.

In one scenario, the determination of number of accidents along the length of at least one road link removes the bias that longer roads are more likely to have more accidents. In another scenario, the determination of number of accidents for a particular duration removes the bias that collection of accident data on a road for a longer period of time is more likely to have more accidents.

FIG. 9 is a graph diagram that represents a map database with road link information, probe data (i.e., probe density information), sign information, or a combination thereof for predicting accident probability for at least one vehicle, according to one example embodiment. In one scenario, the assessment platform 109 may construct a regression model using the novel features on link probe density (901) and signage (903, 905, 907, 909, and 911) to determine in real-time the probability for at least one vehicle to have an accident. In one example embodiment, the assessment platform 109 may consider predefined personalized accident probability threshold for one or more drivers. The assessment platform 109 may send notifications (e.g. seat vibration, flashing light in dashboard, tooting the horn, etc.) to one or more users and/or vehicles if the accident probability threshold is surpassed.

In one scenario, the assessment platform 109 may use signage, probe density, alongside other features (e.g., features from the candidate vehicle 913 such as speed, acceleration, etc.) for the regression model. In another scenario, the assessment platform 109 may not implement a high/low accident potential label for the regression model, instead the number of accidents 915 on a road link per unit time is utilized to create a score that represents the accident potential. Apart from using the accident counts 915, the assessment platform 109 may normalize the accident counts to remove spatial biases by dividing by the link length. In one example embodiment, after supplying the machine learning regression model with many training examples, the regression model may automatically yield a score that represent the accident probability based on newly observed signage and probe density information. The score (i.e. decimal value) indicates the level of danger for a specific vehicle. In one example embodiment, the regression model may be deployed on at least one vehicle. The at least one vehicle may feed information on traffic signs it observes while driving in a road link, current properties (e.g., speed, probe density computed from data obtained from a probe repository, etc.) to the regression model. Then, the regression model predicts the probability of the given vehicle to crash in real-time. In another example embodiment, after building the regression model for any given road and any vehicle, the assessment platform 109 may provide road attribute, probe density, signage information, and vehicle property information. Then, the regression model automatically determines a score that indicates the level of danger for that road link. Each user can have their own personalized threshold that if surpassed triggers notifications.

Figure 10:
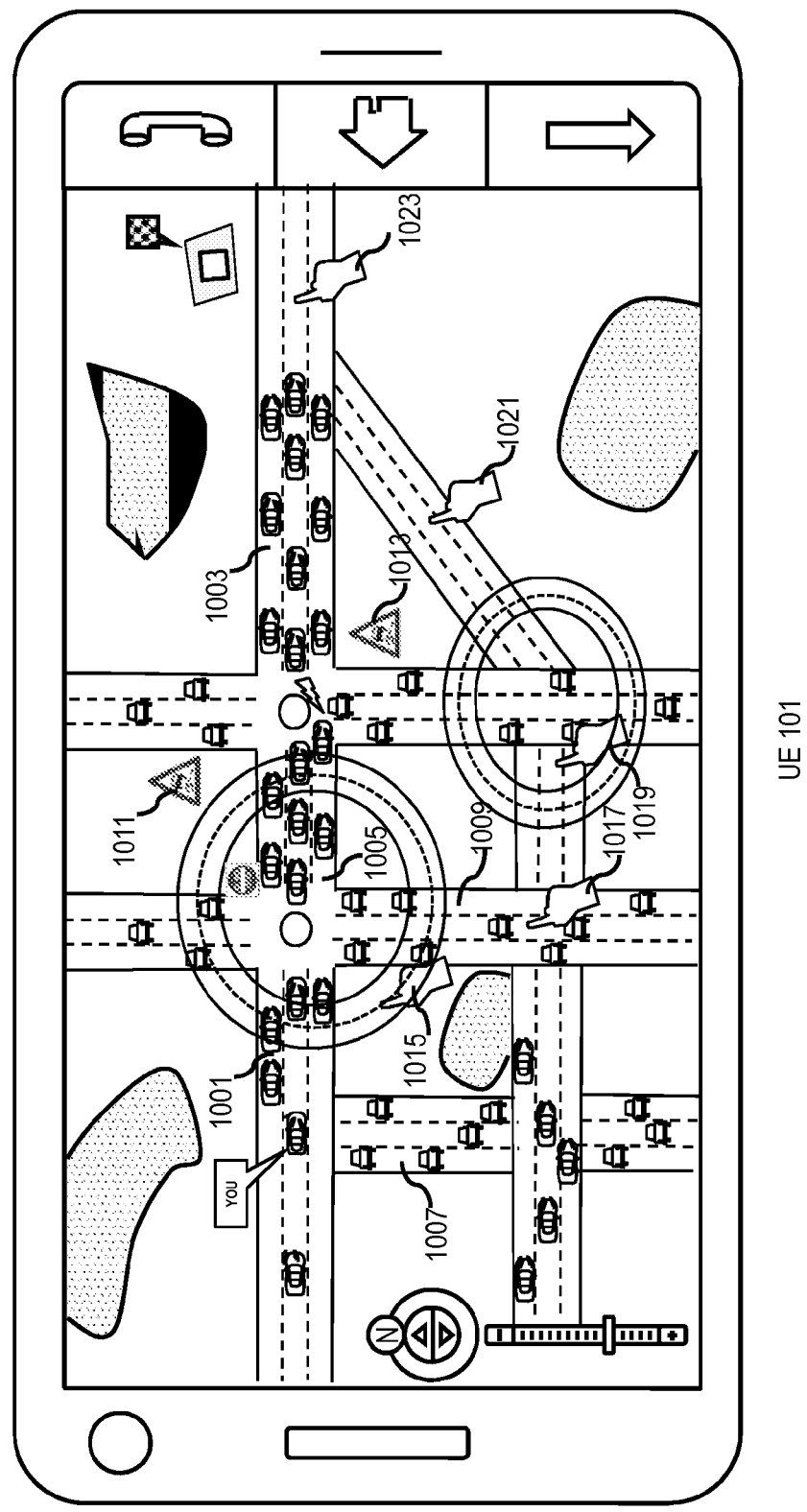
FIG. 10 is a user interface diagram that represents a scenario wherein at least one user, at least one vehicle, or a combination thereof is recommended an alternate route based on probe data and/or traffic signage information, according to one example embodiment.

FIG. 10 is a user interface diagram that represents a scenario wherein at least one user, at least one vehicle, or a combination thereof is recommended an alternate route based on probe data and/or traffic signage information, according to one example embodiment. In one example embodiment, the assessment platform 109 may determine probe data (1001, 1003, 1005, 1007 and 1009) and/or traffic signage information (1011 and 1013) associated with one or more road links to determine accident prone locations. In one scenario, the probe data includes location information, speed information, timestamp information, or a combination thereof for one or more vehicles, traffic density information for the one or more road links, or a combination thereof. In another scenario, the traffic signage information includes characteristics and/or positioning of traffic signs, non-traffic signs, or a combination thereof. Then, the assessment platform 109 may cause a modification of routing information for the one or more vehicles (1015, 1017, 1019, 1021 and 1023) based, at least in part, on proximity of the one or more vehicles to the accident prone locations.

Figure 11:
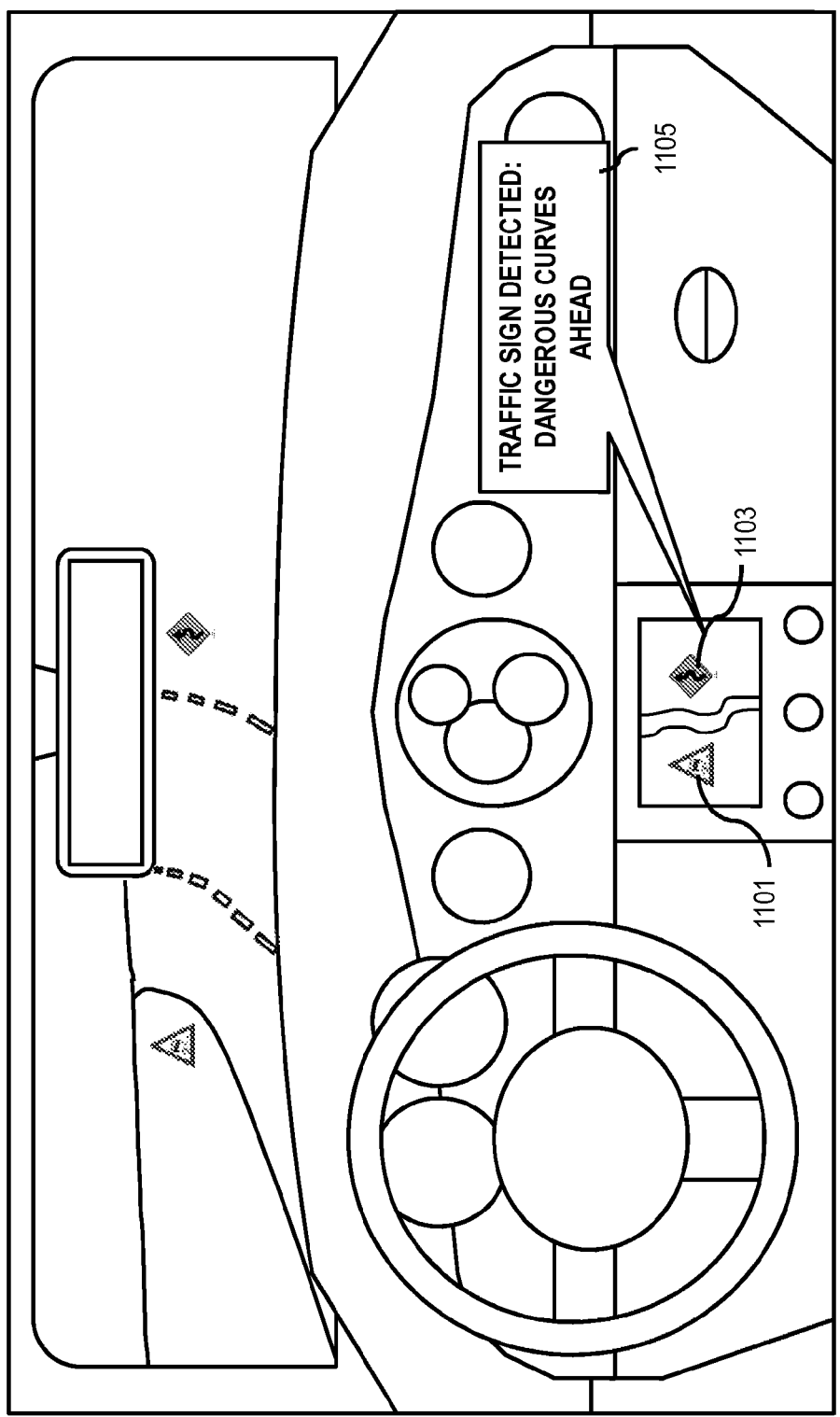
FIG. 11 is a diagram that represents a scenario wherein at least one user is notified on the danger level of one or more road links based on signage information, according to one example embodiment.

FIG. 11 is a diagram that represents a scenario wherein at least one user is notified on the danger level of one or more road links based on signage information, according to one example embodiment. In one scenario, the assessment platform 109 may determine traffic signage information 1101 and 1103 alongside one or more road links to predict the danger level. Then, the assessment platform 109 may cause a grouping of the one or more road links as high accident potential, low accident potential, or a combination thereof based on the danger level. Subsequently, the assessment platform 109 may cause a notification 1105 to one or more users, one or more vehicles, or a combination thereof on the danger level for one or more road links. In one scenario, the notification may include a color representation of the accident-prone location in a mapping interface. In another scenario, the one or more autonomous vehicles (e.g., a self-driving vehicle) may detect traffic signage information automatically. Then, the one or more autonomous vehicles may feed the detected traffic signage information to the assessment platform 109. Subsequently, the assessment platform 109 may determine the level of danger for one or more locations. Then, the one or more autonomous vehicles may cause an adjustment in the driving strategy. This also applies to partially autonomous vehicles and manually driven vehicles.

Figure 12:
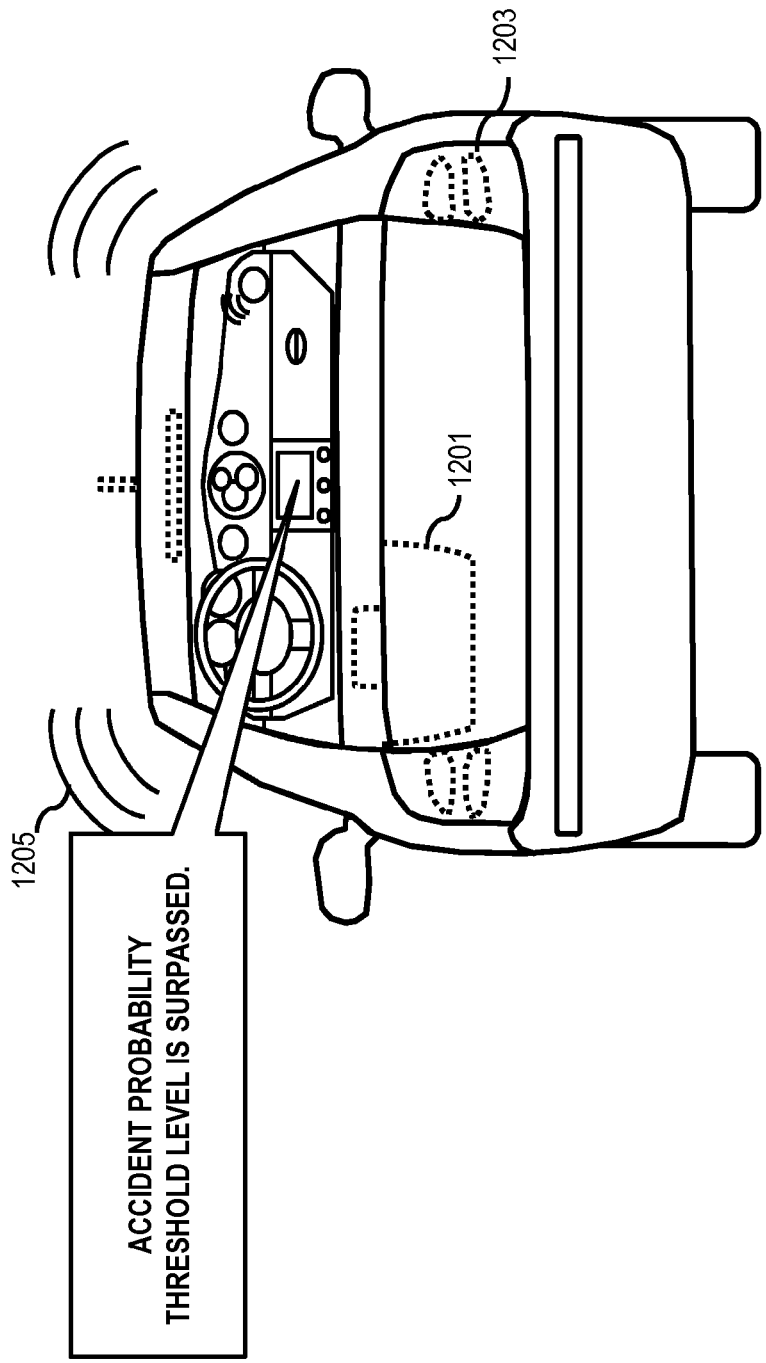
FIG. 12 is a diagram that represents a scenario wherein at least one user, at least one vehicle, or a combination thereof is alerted on accident probability, according to one example embodiment.

FIG. 12 is a diagram that represents a scenario wherein at least one user, at least one vehicle, or a combination thereof is alerted on accident probability, according to one example embodiment. In one scenario, the assessment platform 109 may determine accident probability threshold level in real-time for the one or more users, the one or more vehicles, or a combination thereof. In one example embodiment, the assessment platform 109 may determine a predefined personalized accident probability threshold for at least one driver. Then, the assessment platform 109 may cause an alarm notification if the accident probability threshold level is surpassed. The alarm notification includes sound notification (e.g., tooting the horn 1205), display notification (e.g., flashing light in dashboard 1203), vibration (e.g., seat vibration 1201), or a combination thereof.

Figure 13A:
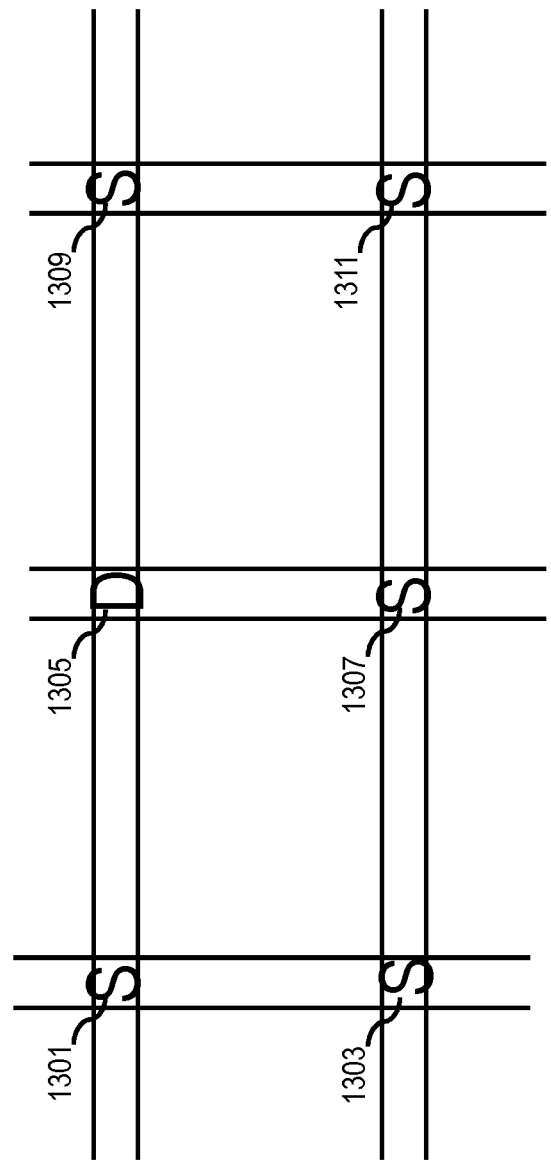
FIG. 13A is a diagram that represents a scenario wherein one or more intersections are assigned to a particular category based on their safety levels, according to one example embodiment.

FIG. 13A is a diagram that represents a scenario wherein one or more intersections are assigned to a particular category based on their safety levels, according to one example embodiment. In one example embodiment, the assessment platform 109 may determine intersections 1301, 1303, 1307, 1309 and 1311 as safe, whilst intersection 1305 as dangerous. In one scenario, the determination of safety levels for one or more intersections may be the output of a classification model with predefined criteria for safety level. In another scenario, the categories can also be derived from a regression model with some assigned threshold on the scores. Though example calculates scores at intersections, this process can be implemented to any road links or any defined geolocation.

Figure 13B:
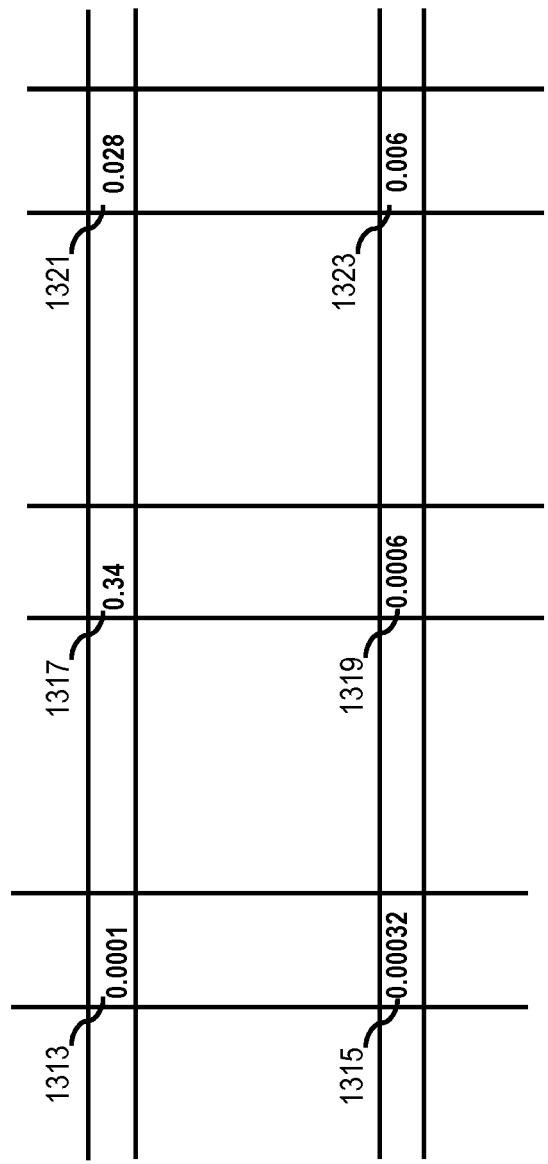
FIG. 13B is a diagram that represents a scenario wherein accident scores for one or more intersections are displayed, according to one example embodiment.

FIG. 13B is a diagram that represents a scenario wherein accident scores for one or more intersections are displayed, according to one example embodiment. These scores are the output of the regression model and serves as a measure for the risk of accident in the one or more intersections. In one example embodiment, the assessment platform 109 may determine intersections 1313, 1315, 1319, 1321 and 1323 as safe because the accident scores are relatively low, whereas intersection 1317 may be labelled as dangerous because of the higher accident score. In one scenario, the normalization of the scores may depend on the used case scenario. Though example calculates scores at intersections, this process can be implemented to any road links or any defined geolocation.

The processes described herein for determining safety levels for one or more locations based, at least in part, on signage information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 14:
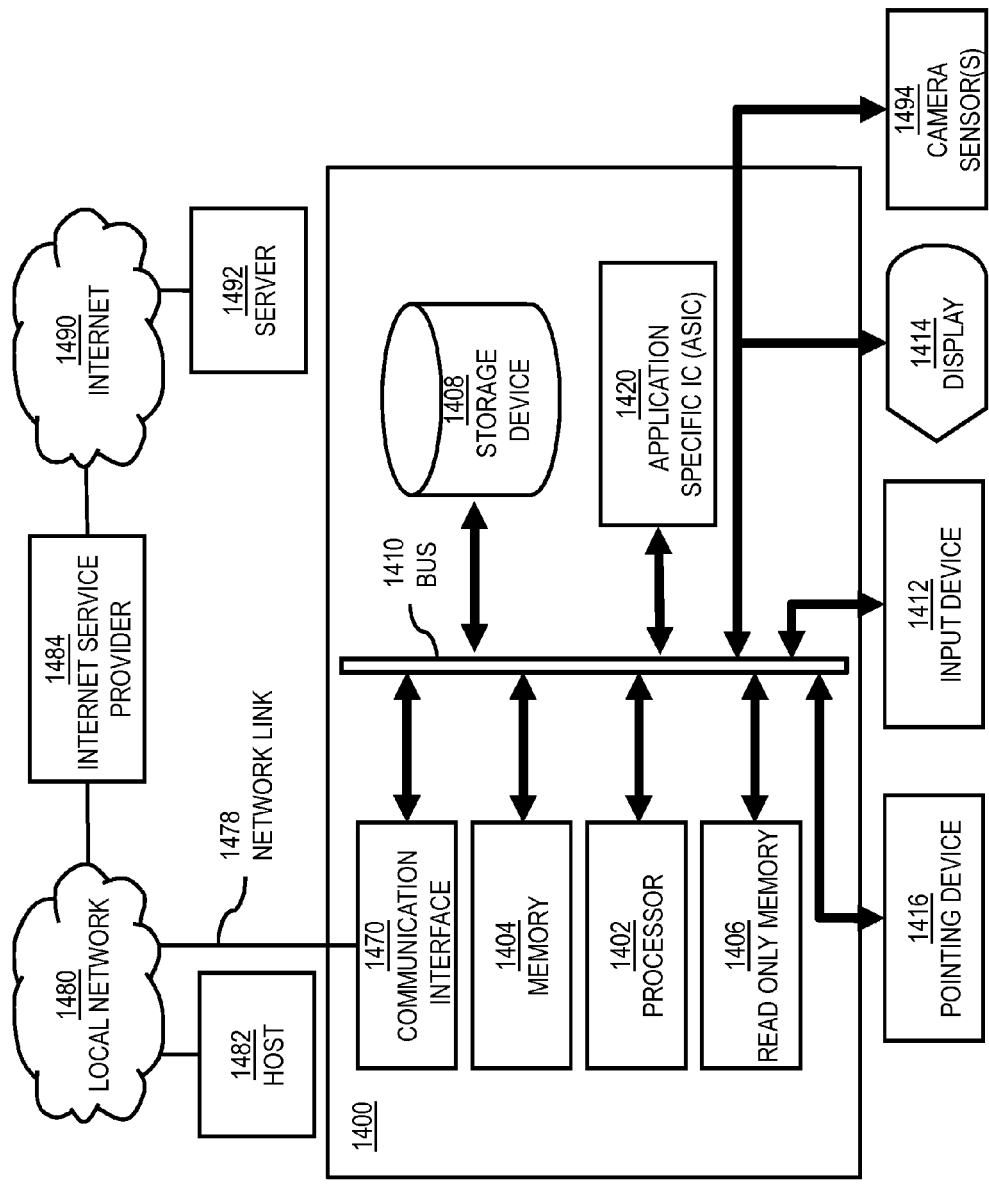
FIG. 14 is a diagram of hardware that can be used to implement an embodiment of the invention.

FIG. 14 illustrates a computer system 1400 upon which an embodiment of the invention may be implemented. Although computer system 1400 is depicted with respect to a particular device or equipment, it is contemplated that other devices or equipment (e.g., network elements, servers, etc.) within FIG. 14 can deploy the illustrated hardware and components of system 1400. Computer system 1400 is programmed (e.g., via computer program code or instructions) to determine safety levels for one or more locations based, at least in part, on signage information as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more steps of determining safety levels for one or more locations based, at least in part, on signage information.

A bus 1410 includes one or more parallel conductors of information so that information is transferred quickly among devices coupled to the bus 1410. One or more processors 1402 for processing information are coupled with the bus 1410.

A processor (or multiple processors) 1402 performs a set of operations on information as specified by computer program code related to determining safety levels for one or more locations based, at least in part, on signage information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1400 also includes a memory 1404 coupled to bus 1410. The memory 1404, such as a random access memory (RAM) or any other dynamic storage device, stores information including processor instructions for determining safety levels for one or more locations based, at least in part, on signage information. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or any other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk or flash card, for storing information, including instructions, that persists even when the computer system 1400 is turned off or otherwise loses power.

Information, including instructions for determining safety levels for one or more locations based, at least in part, on signage information, is provided to the bus 1410 for use by the processor from an external input device 1412, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT), a liquid crystal display (LCD), a light emitting diode (LED) display, an organic LED (OLED) display, a plasma screen, or a printer for presenting text or images, and a pointing device 1416, such as a mouse, a trackball, cursor direction keys, or a motion sensor, for controlling a position of a small cursor image presented on the display 1414 and issuing commands associated with graphical elements presented on the display 1414, and one or more camera sensors 1494 for capturing, recording and causing to store one or more still and/or moving images (e.g., videos, movies, etc.) which also may comprise audio recordings. In some embodiments, for example, in embodiments in which the computer system 1400 performs all functions automatically without human input, one or more of external input device 1412, display device 1414 and pointing device 1416 may be omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of ASICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection to the communication network 107 for determining safety levels for one or more locations based, at least in part, on signage information to the UE 101.

The term "computer-readable medium" as used herein refers to any medium that participates in providing information to processor 1402, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1408. Volatile media include, for example, dynamic memory 1404. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1420.

Network link 1478 typically provides information communication using transmission media through one or more networks to other devices that use or process the information. For example, network link 1478 may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490.

A computer called a server host 1492 connected to the Internet hosts a process that provides a service in response to information received over the Internet. For example, server host 1492 hosts a process that provides information representing video data for presentation at display 1414. It is contemplated that the components of system 1400 can be deployed in various configurations within other computer systems, e.g., host 1482 and server 1492.

At least some embodiments of the invention are related to the use of computer system 1400 for implementing some or all of the techniques described herein. According to one embodiment of the invention, those techniques are performed by computer system 1400 in response to processor 1402 executing one or more sequences of one or more processor instructions contained in memory 1404. Such instructions, also called computer instructions, software and program code, may be read into memory 1404 from another computer-readable medium such as storage device 1408 or network link 1478. Execution of the sequences of instructions contained in memory 1404 causes processor 1402 to perform one or more of the method steps described herein.

In alternative embodiments, hardware, such as ASIC 1420, may be used in place of or in combination with software to implement the invention. Thus, embodiments of the invention are not limited to any specific combination of hardware and software, unless otherwise explicitly stated herein.

The signals transmitted over network link 1478 and other networks through communications interface 1470, carry information to and from computer system 1400. Computer system 1400 can send and receive information, including program code, through the networks 1480, 1490 among others, through network link 1478 and communications interface 1470. In an example using the Internet 1490, a server host 1492 transmits program code for a particular application, requested by a message sent from computer 1400, through Internet 1490, ISP equipment 1484, local network 1480 and communications interface 1470. The received code may be executed by processor 1402 as it is received, or may be stored in memory 1404 or in storage device 1408 or any other non-volatile storage for later execution, or both. In this manner, computer system 1400 may obtain application program code in the form of signals on a carrier wave.

Various forms of computer readable media may be involved in carrying one or more sequence of instructions or data or both to processor 1402 for execution. For example, instructions and data may initially be carried on a magnetic disk of a remote computer such as host 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red carrier wave serving as the network link 1478. An infrared detector serving as communications interface 1470 receives the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

FIG. 15 illustrates a chip set or chip 1500 upon which an embodiment of the invention may be implemented. Chip set 1500 is programmed to determine safety levels for one or more locations based, at least in part, on signage information as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1500 can be implemented in a single chip. It is further contemplated that in certain embodiments the chip set or chip 1500 can be implemented as a single "system on a chip." It is further contemplated that in certain embodiments a separate ASIC would not be used, for example, and that all relevant functions as disclosed herein would be performed by a processor or processors. Chip set or chip 1500, or a portion thereof, constitutes a means for performing one or more steps of providing user interface navigation information associated with the availability of functions. Chip set or chip 1500, or a portion thereof, constitutes a means for performing one or more steps of determining safety levels for one or more locations based, at least in part, on signage information.

In one embodiment, the chip set or chip 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real-time independently of the processor 1503. Similarly, an ASIC 1509 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1500 includes merely one or more processors and some software and/or firmware supporting and/or relating to and/or for the one or more processors.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to determine safety levels for one or more locations based, at least in part, on signage information. The memory 1505 also stores the data associated with or generated by the execution of the inventive steps.

Figure 16:
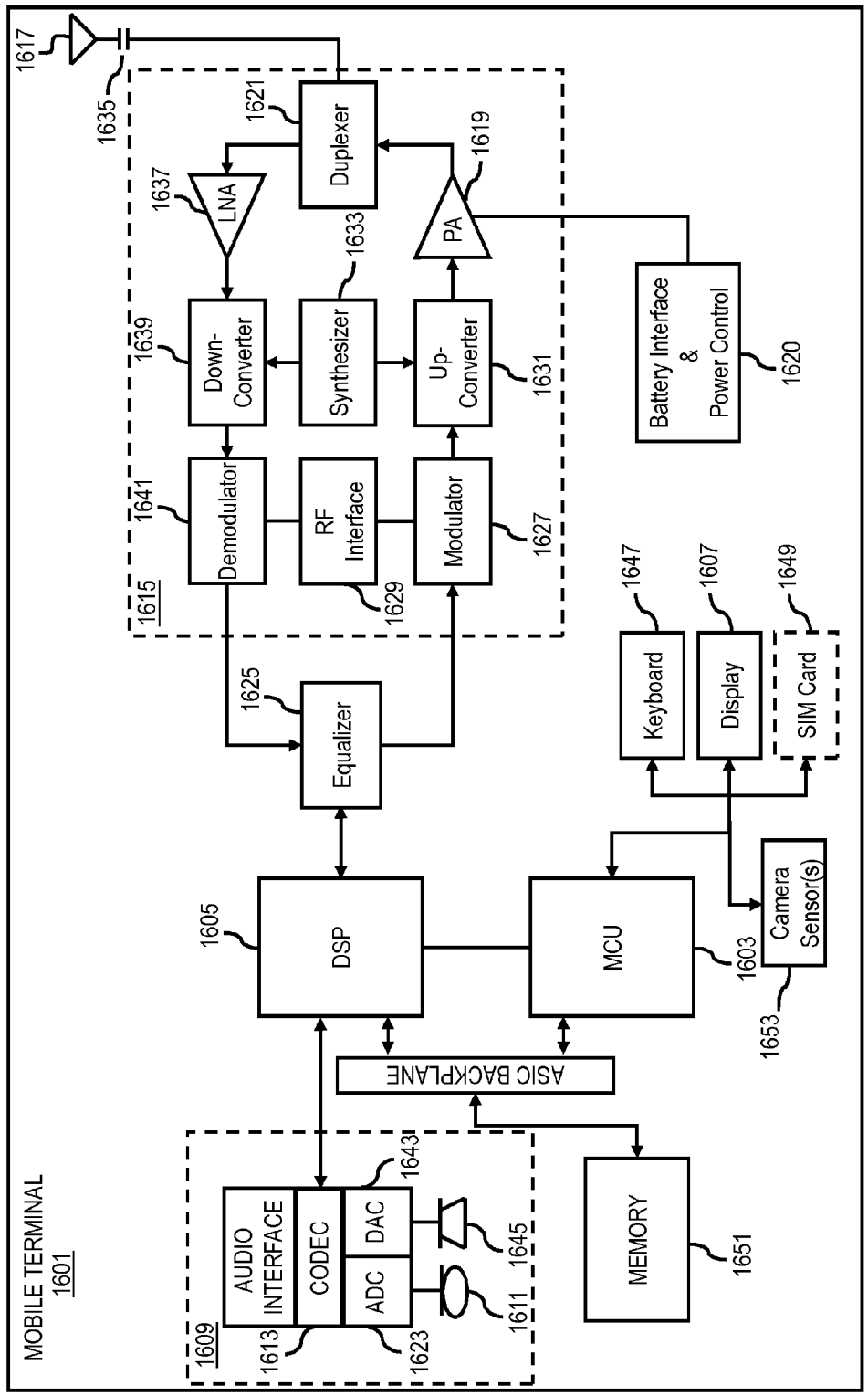
FIG. 16 is a diagram of a mobile terminal (e.g., handset) that can be used to implement an embodiment of the invention.

FIG. 16 is a diagram of exemplary components of a mobile terminal (e.g., handset) for communications, which is capable of operating in the system of FIG. 1, according to one embodiment. In some embodiments, mobile terminal 1601, or a portion thereof, constitutes a means for performing one or more steps of determining safety levels for one or more locations based, at least in part, on signage information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1603, a Digital Signal Processor (DSP) 1605, and a receiver/transmitter unit including a microphone gain control unit and a speaker gain control unit. A main display unit 1607 provides a display to the user in support of various applications and mobile terminal functions that perform or support the steps of determining safety levels for one or more locations based, at least in part, on signage information. The display 1607 includes display circuitry configured to display at least a portion of a user interface of the mobile terminal (e.g., mobile telephone). Additionally, the display 1607 and display circuitry are configured to facilitate user control of at least some functions of the mobile terminal. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile terminal 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603 which can be implemented as a Central Processing Unit (CPU).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile terminal 1601 to determine safety levels for one or more locations based, at least in part, on signage information. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the terminal. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile terminal 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable storage medium known in the art. The memory device 1651 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1649 carries, for instance, important information, such as the cellular phone number, the carrier supplying service, subscription details, and security information. The SIM card 1649 serves primarily to identify the mobile terminal 1601 on a radio network.

The card 1649 also contains a memory for storing a personal telephone number registry, text messages, and user specific mobile terminal settings.

Further, one or more camera sensors 1653 may be incorporated onto the mobile station 1601 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    acquiring signage information, by way of at least one sensor and at least one of the following: a map, a database and cloud, the signage information associated with at least one location, the signage information including a presence of one or more signs in the at least one location, one or more characteristics of the one or more signs, one or more locations of the one or more signs, or a combination thereof, and wherein the one or more signs include, at least in part, one or more physical signs, one or more virtual signs, or a combination thereof, and wherein the one or more signs include, at least in part, a combination of one or more traffic signs and one or more non-traffic signs;
    creating at least one predictor model based, at least in part, on the signage information and one or more attributes associated with the at least one location, wherein the one or more attributes associated with the at least one location include, at least in part, a traffic volume attribute;
    classifying the at least one location, one or more other locations, or a combination thereof according to one or more safety levels using, at least in part, the at least one predictor model; and
    using normalized probe density data as a proxy for the traffic volume attribute,
    wherein the normalized probe density data is derived from probe data that has been filtered, the probe data includes more than one of historical safety information, speed information, and timestamp information, for one or more vehicles in at least one road link associated with the at least one location, and
    wherein the filtered probe data has been map-matched with historical accident data.

2. The method of claim 1, further comprising:
    determining the historical safety information for the at least one location, wherein the historical safety information includes, at least in part, historical accident information for the at least one location; and
    training the at least one predictor model based, at least in part, on the historical safety information.

3. The method of claim 2, further comprising:
    labeling the at least one location according to the one or more safety levels using the historical safety information,
    wherein the training of the at least one predictor model is based, at least in part, on the labeling.

4. The method of claim 3, further comprising:

processing of the historical safety information to determine a number of accidents, a number of accidents per length of road segment, a number of accidents per unit of time, or a combination thereof, wherein the labeling of the at least one location is based, at least in part, on the number of accidents, the number of accidents per length of road segment, the number of accidents per unit of time, or a combination thereof.

5. The method of claim 1, further comprising at least one of the following:

ranking the at least one location, the one or more other locations, or a combination thereof based, at least in part, on the one or more safety levels;

presenting at least one map encompassing the at least one location, the one or more other locations, or a combination thereof that is coded to show the one or more safety levels;

presenting one or more notifications based, at least in part, on the one or more safety levels; and calculating at least one navigation route to avoid one or more areas based, at least in part, on the one or more safety levels.

6. The method of claim 1, wherein (a) the creation of the at least one predictor model; (b) the classification of the at least one location, one or more other locations, or a combination thereof; or (c) a combination thereof is performed with respect to an individual user, a group of users, or a combination thereof.

7. The method of claim 1, wherein the signage information includes, at least in part, an absence of the one or more signs in the at least one location, a detectability of the one or more signs, or a combination thereof.

8. An apparatus comprising:

at least one processor; and at least one memory including computer program code for one or more programs, the at least one memory and the computer program code configured to, with the at least one processor, cause the apparatus to perform at least the following, acquiring signage information, by way of at least one sensor and at least one of the following: a map, a database and cloud, the signage information associated with at least one location and the signage information including a presence of one or more signs in the at least one location, one or more characteristics of the one or more signs, one or more locations of the one or more signs, or a combination thereof, and wherein the one or more signs include, at least in part, a combination of one or more traffic signs and one or more non-traffic signs;

creating at least one predictor model based, at least in part, on the signage information and one or more attributes associated with the at least one location, wherein the one or more attributes associated with the at least one location include, at least in part, a traffic volume attribute;

classifying the at least one location, one or more other locations, or a combination thereof according to one or more safety levels using, at least in part, the at least one predictor model; and using normalized probe density data as a proxy for the traffic volume attribute, wherein the normalized probe density data is derived from probe data that has been filtered, the probe data includes more than one of historical safety information, speed information, and timestamp information, for one or more vehicles in at least one road link associated with the at least one location, and wherein the filtered probe data has been map-matched with historical accident data.

9. The apparatus of claim 8, wherein the one or more signs include, at least in part, one or more physical signs, one or more virtual signs, or a combination thereof.

10. The apparatus of claim 8, wherein the apparatus is further caused to:

determine the historical safety information for the at least one location, wherein the historical safety information includes, at least in part, historical accident information for the at least one location; and train the at least one predictor model based, at least in part, on the historical safety information.

11. The apparatus of claim 10, wherein the apparatus is further caused to:

label the at least one location according to the one or more safety levels using the historical safety information, wherein the training of the at least one predictor model is based, at least in part, on the labeling.

12. A non-transitory computer-readable storage medium carrying one or more sequences of one or more instructions which, when executed by one or more processors, cause an apparatus to at least perform the following steps:

acquiring signage information, by way of at least one sensor and at least one of the following: a map, a database and cloud, the signage information associated with at least one location and the signage information including a presence of one or more signs in the at least one location, one or more characteristics of the one or more signs, one or more locations of the one or more signs, or a combination thereof, and wherein the one or more signs include, at least in part, a combination of one or more traffic signs and one or more non-traffic signs;

creating at least one predictor model based, at least in part, on the signage information and one or more attributes associated with the at least one location, wherein the one or more attributes associated with the at least one location include, at least in part, a traffic volume attribute;

classifying the at least one location, one or more other locations, or a combination thereof according to one or more safety levels using, at least in part, the at least one predictor model; and using normalized probe density data as a proxy for the traffic volume attribute, wherein the normalized probe density data is derived from probe data that has been filtered, the probe data includes more than one of historical safety information, speed information, and timestamp information, for one or more vehicles in at least one road link associated with the at least one location, and wherein the filtered probe data has been map-matched with historical accident data.

* * * * *